(12) United States Patent
Ma et al.

(10) Patent No.: US 10,613,267 B2
(45) Date of Patent: Apr. 7, 2020

(54) LIGHT GUIDE ASSEMBLY, BACKLIGHT SOURCE AND DISPLAY DEVICE

(71) Applicant: BOE Technology Group Co., Ltd., Beijing (CN)

(72) Inventors: Xinli Ma, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 192 days.

(21) Appl. No.: 15/984,635

(22) Filed: May 21, 2018

(65) Prior Publication Data

US 2019/0094449 A1 Mar. 28, 2019

(30) Foreign Application Priority Data

Sep. 28, 2017 (CN) .......................... 2017 1 0896386

(51) Int. Cl.
*G02B 5/04* (2006.01)
*F21V 8/00* (2006.01)

(52) U.S. Cl.
CPC ......... *G02B 6/0053* (2013.01); *G02B 6/0055* (2013.01); *G02B 6/0036* (2013.01); *G02B 6/0051* (2013.01)

(58) Field of Classification Search
CPC ..... F24S 23/12; G02B 6/0036; G02B 6/0046; G02B 6/10
See application file for complete search history.

(56) References Cited

U.S. PATENT DOCUMENTS

| | | | | |
|---|---|---|---|---|
| 2002/0080598 A1* | 6/2002 | Parker | ................. | G02B 6/0036 362/616 |
| 2004/0109303 A1* | 6/2004 | Olczak | ................. | G02B 5/045 362/19 |
| 2007/0189034 A1* | 8/2007 | Kim | ..................... | G02B 6/0053 362/607 |
| 2008/0218858 A1* | 9/2008 | Mi | ....................... | G02B 6/0053 359/485.01 |

* cited by examiner

*Primary Examiner* — Andrew J Coughlin
(74) *Attorney, Agent, or Firm* — Westman, Champlin & Koehler, P.A.

(57) ABSTRACT

A light guide assembly, a backlight source and a display device are provided. The light guide assembly includes: a first medium layer including a first light incidence face and a first light exit face opposed to each other; at least one triangular prism unit on the first light exit face, each triangular prism unit including a second light incidence face, a second light exit face and a non-exit face, the second light incidence face being in contact with the first light exit face; and a second medium layer covering the second light exit face, refractive index $n_2$ of each triangular prism unit is greater than refractive index $n_3$ of the first medium layer and refractive index $n_1$ of the second medium layer; and wherein an angle A between the second light incidence face and the second light exit face meets: $\alpha+\beta-10°<A<\alpha+\beta$, where $\alpha=\arcsin(n_1/n_2)$ and $\beta=\arcsin(n_3/n_2)$.

19 Claims, 5 Drawing Sheets

LIGHT GUIDE ASSEMBLY, BACKLIGHT SOURCE AND DISPLAY DEVICE

CROSS-REFERENCE TO RELATED APPLICATION

This application claims the priority benefit of the Chinese Patent Application No. 201710896386.2 filed on Sep. 28, 2017 in the State Intellectual Property Office of China, the whole disclosure of which is incorporated herein by reference.

TECHNICAL FIELD

The present disclosure relates to the field of display technology, more particularly, to a light guide assembly, a backlight source and a display device.

DESCRIPTION OF THE RELATED ART

At present, the people pay more and more attention to their own privacy. However, most of display devices, such as cell phones used frequently by the people, have a range of visual angle. The people can see information on the cell phones as long as they are within the range of visual angle. Thus, the information on the cell phones may be snooped in the public.

Therefore, anti-peep display devices need to be studied.

SUMMARY

An embodiment of the present disclosure provides a light guide assembly, including:

a first medium layer including a first light incidence face and a first light exit face opposed to each other;

at least one triangular prism unit on the first light exit face, each of the at least one triangular prism unit including a second light incidence face, a second light exit face and a non-exit face, the second light incidence face being in contact with the first light exit face; and a second medium layer covering the second light exit face, wherein refractive index $n_2$ of each of the at least one triangular prism unit is greater than refractive index $n_3$ of the first medium layer and refractive index $n_1$ of the second medium layer; and wherein an angle A between the second light incidence face and the second light exit face meets:

$$\alpha+\beta-10°<A<\alpha+\beta,$$

where $\alpha=\arcsin(n_1/n_2)$ and $\beta=\arcsin(n_3/n_2)$.

In some embodiments, the angle A between the second light incidence face and the second light exit face meets:

$$\alpha+\beta-3°<A<\alpha+\beta.$$

In some embodiments, an angle between the second light incidence face and the non-exit face is $90°-\beta$.

In some embodiments, the non-exit face is provided with a reflective layer.

In some embodiments, the non-exit face in cross section is provided with saw teeth, each of the saw teeth having an apex angle of $90°$.

In some embodiments, the non-exit face is provided with a light absorption layer.

In some embodiments, each of the at least one triangular prism unit has refractive index greater than or equal to 1.5.

In some embodiments, each of the at least one triangular prism unit is made from $SiN_x$ or glass.

In some embodiments, the refractive index $n_3$ of the first medium layer is less than 1.5.

In some embodiments, the first medium layer is made from silicon dioxide or silicon dioxide aerogel.

In some embodiments, the refractive index $n_1$ of the second medium layer is less than or equal to 1.1.

In some embodiments, the second medium layer includes air or glass.

In some embodiments, the light guide assembly further includes a light adjusting device configured to adjust a direction along which light is emitted from the second medium layer.

In some embodiments, the light adjusting device is a refractive device or a reflective device.

In some embodiments, the at least one triangular prism unit includes a plurality of triangular prism units arranged side by side on the first light exit face.

An embodiment of the present disclosure provides a backlight source including:

the light guide assembly as described above;

a light guide plate, the light guide assembly being on a first surface of the light guide plate and the first light incidence face being adjacent to the first surface; and a light source, wherein the light source is an edge lighting source or a bottom lighting source.

In some embodiments, the backlight source further includes a scattering pattern on the first surface of the light guide plate and at a side of the first light incidence face facing towards the first surface.

An embodiment of the present disclosure provides a display device including the light guide assembly as described above.

An embodiment of the present disclosure provides a display device including the backlight source as described above.

DETAILED DESCRIPTION OF EMBODIMENTS

Embodiments of the present disclosure will be explained explicitly and entirely below. The following embodiments are exemplified, and are only used to explain the present disclosure, instead of being understood to limit the present disclosure. The embodiments in which the specific technology or conditions are not noted will be performed according to the technology or conditions described in literatures in the art or according to product specification. All of agents or instruments on which manufacturers are not noted are conventional products that may be purchased in market.

Figure 1:
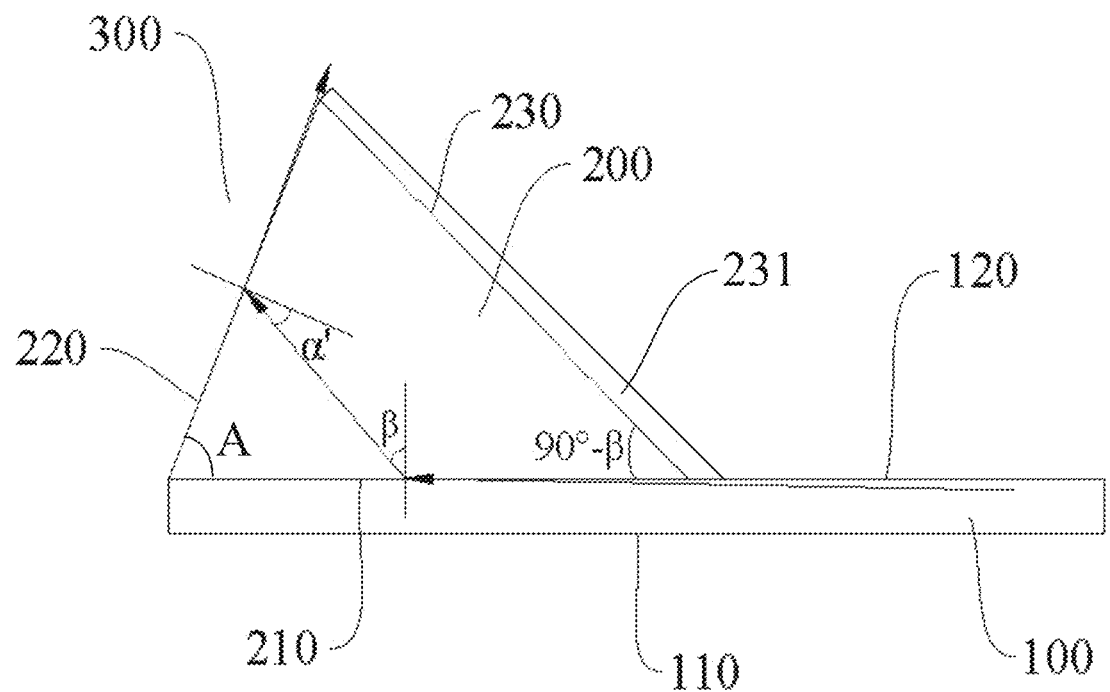
FIG. 1 is a schematic view showing a structure of a light guide assembly according to an embodiment of the present disclosure.

An embodiment of the present disclosure provides a light guide assembly 10. As illustrated in FIG. 1, the light guide assembly 10 includes: a first medium layer 100 including a first light incidence face 110 and a first light exit face 120 opposed to each other; a triangular prism unit 200 on the first light exit face 120, the triangular prism unit 200 including a second light incidence face 210, a second light exit face 220 and a non-exit face 230, the second light exit face 210 being in contact with the first light exit face 120; and a second medium layer 300 covering the second light exit face 220. The refractive index $n_2$ of the triangular prism unit 200 is greater than the refractive index $n_3$ of the first medium layer 100 and the refractive index $n_1$ of the second medium layer 300. A light may be incident from the first light incidence face 110 of the first medium layer 100 and pass through the first medium layer 100 and the triangular prism unit 200. When the light travels to an interface between the second light exit face 220 of the triangular prism unit 200 and the second medium layer 300, if its incident angle is less than a total reflection critical angle at the interface, the light may pass through the second light exit face 220 and enter the second medium layer 300 from the triangular prism unit 200. In order to control the direction of the light emitted from the second light exit face 220, an angle A between the second light incidence face 210 and the second light exit face 220 may meet:

$$\alpha+\beta-\theta < A < \alpha+\beta \quad \text{(Equation 1)}$$

where $\alpha=\arcsin(n_1/n_2)$ and $\beta=\arcsin(n_3/n_2)$. $\alpha$ may be called as the total reflection critical angle at the interface between the second light exit face 220 and the second medium layer 300. $\beta$ may be called as the total reflection critical angle at the interface between the second light incidence face 210 and the first medium layer 100. $\theta$ is a predetermined angle difference. The convergence of the light emitted from the second light exit face 220 will increase as $\theta$ decreases. In contrast, divergence of the light emitted from the second light exit face 220 will increase as $\theta$ increases. The sign "/" denotes sign of division. The sign "arcsin ( )" denotes an inverse sine function.

As an example, $\theta$ may be less than or equal to 10°, for example, $\theta$ may be less than or equal to 5°, even less than or equal to 3°. In this way, the light emitted from the second light exit face 220 may be relatively convergent, to further enable a light beam to travel towards a certain direction, for example, it may be used for anti-peep. When the light emitted from the second light exit face 220 is relatively convergent, the light emitted from the second light exit face 220 will not be seen unless it is observed against the traveling direction of the light. In contrast, the light emitted from the second light exit face 220 will not be seen from other directions.

As an example, the light may have a refraction angle of 85° to 90°. The light is not permitted to exit from the non-exit face 230. The refractive index $n_2$ of the triangular prism unit is greater than the refractive index $n_3$ of the first medium layer, thus the refraction angle of the refracted light entering the triangular prism unit from the first medium layer is in a range of 0° to $\beta$. By adjusting the refractive index $n_1$ of the second medium layer, the light exits in a direction almost along the second light exit face when the light enters the second medium layer from the triangular prism unit, to obtain a light beam having a relatively small divergent angle and the light does not exit from the non-exit face. Thus, except the above relatively convergent light beam, other stray light may not exit from the triangular prism unit, to provide a light source for irradiating towards the certain direction, and to achieve effects of controlling an optical path.

According to the embodiment of the present disclosure, as illustrated in FIG. 1, the angle between the second light incidence face 210 and the non-exit face 230 is 90°−β, i.e., 90° minus β where $$\beta = \arcsin\frac{n_3}{n_2}.$$

Thus, when the incident angle of the light entering the triangular prism unit 200 form the first medium layer 100 is approximately 90°, the refraction angle of the light approximately satisfies $$\beta = \arcsin\frac{n_3}{n_2}.$$

At this time, the refracted light is substantially parallel to the non-exit face 230. Further, it may form an angle α'+β between the second light exit face 220 and the second light incidence face 210. By adjusting the magnitude of a'+β, the incident angle α' of the light entering the second medium layer 300 from the triangular prism unit 200 is in the range of α-θ to α, where the sign "−" denotes minus. In this way, when the light enters the second medium layer 300 from the triangular prism unit 200, the emitting light may become a relatively convergent light beam, to provide a light source irradiating towards a certain direction and to achieve the effects of controlling the optical path, where α' is an incident angle of the light entering the second medium layer from the triangular prism unit.

According to the embodiment of the present disclosure, the specific magnitude of refractive index of the triangular prism unit is not limited as long as the refractive index of the triangular prism unit is greater than the refractive index of the first medium layer and the refractive index of the second medium layer. In some embodiments of the present disclosure, triangular prism unit may have refractive index greater than or equal to 1.5, for example, it may be 1.55, 1.6, 1.65, 1.7, 1.8, 1.9, 2.0, and so on. Thus, it may ensure the triangular prism unit may have a relatively large refractive index such that the refraction angle of the refracted light entering the triangular prism unit from the first medium layer is in the range of 0° to β. In order to ensure the refractive index of the triangular prism unit to be greater than or equal to 1.5, in some embodiments of the present disclosure, the triangular prism unit 200 is made from $SiN_x$ or glass having the refractive index greater than or equal to 1.5. Thus, the triangular prism unit 200 has good performance, broad source of material, and low cost.

According to the embodiment of the present disclosure, the specific magnitude of refractive index of the first medium layer is not limited as long as the refractive index of the first medium layer is less than the refractive index of the triangular prism unit 200. In some embodiments of the present disclosure, the first medium layer may have refractive index $n_3$ less than 1.5, for example, it may be 1.4, 1.3, 1.25, 1.2, and so on. Thus, it may ensure that the refraction angle of the refracted light entering the triangular prism unit 200 from the first medium layer 100 is in the range of 0° to β. In some embodiments of the present disclosure, the first medium layer 100 may be made from silicon dioxide or silicon dioxide aerogel. Thus, it can be satisfied that the first medium layer has the refractive index less than 1.5.

Figure 1A:
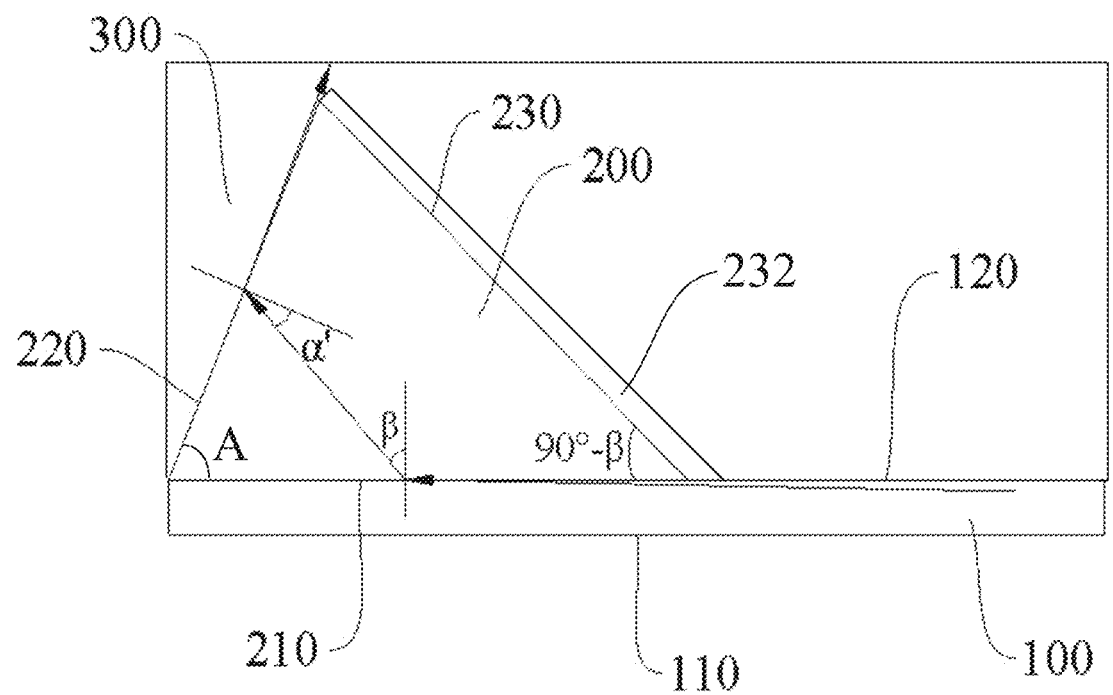
FIG. 1*a* is a schematic view showing a structure of a light guide assembly according to another embodiment of the present disclosure.

According to the embodiment of the present disclosure, the specific magnitude of refractive index of the second medium layer is not limited as long as the refractive index of the second medium layer is less than the refractive index of the triangular prism unit 200. In some embodiments of the present disclosure, the second medium layer 300 may have refractive index m less than or equal to 1.1, for example, it may be 1.05. Thus, it may ensure that the refraction angle of the light entering the second medium layer 300 from the triangular prism unit 200 is in the range of 85° to 90°, to form the light beam having relatively small divergent angle. In some embodiments of the present disclosure, the second medium layer 300 may be made from air. Thus, it can save cost. In other embodiments of the present disclosure, the second medium layer 300 may be made from glass having refractive index less than or equal to 1.1. In this way, the second medium layer 300 can protect the triangular prism unit, as shown in FIG. 1a.

In accordance with the embodiments of the present disclosure, it is desired to prevent the light in the triangular prism unit 200 from being emitted from the non-exit face 230 and thus avoid degrading the convergence of the light emitted from the second medium layer 300 and degrading control of the optical path. In some embodiments of the present disclosure, a light absorption layer 231 (for example made from light absorption material) may be provided on the non-exit face 230. Thus, when the light in the triangular prism unit 200 reaches the non-exit face 230, the light is absorbed by the light absorption layer 231.

In accordance with the embodiments of the present disclosure, the specific types of the materials of the light absorption layer 231 are not limited and can be selected flexibly by the skilled person in the art as required. In some embodiments of the present disclosure, the material of the light absorption layer may be black ink. Thus, the light absorption layer 231 has good effects of light absorption and low cost.

In accordance with the embodiments of the present disclosure, in order to improve the coefficient of utilization of the light, a reflective layer 232 may be provided on the non-exit face. In this way, the light incident on the non-exit face from the triangular prism unit may be reflected back and be recycled to further increase the coefficient of utilization of the light.

In accordance with the embodiments of the present disclosure, the specific types of the materials of the reflective layer 232 are not limited and can be selected flexibly by the skilled person in the art as required. In some embodiments of the present disclosure, the reflective layer 232 may be made from metal such as aluminium, silver or alloy. Thus, the reflective layer 232 may have high optical reflectivity and low cost.

Figure 2:
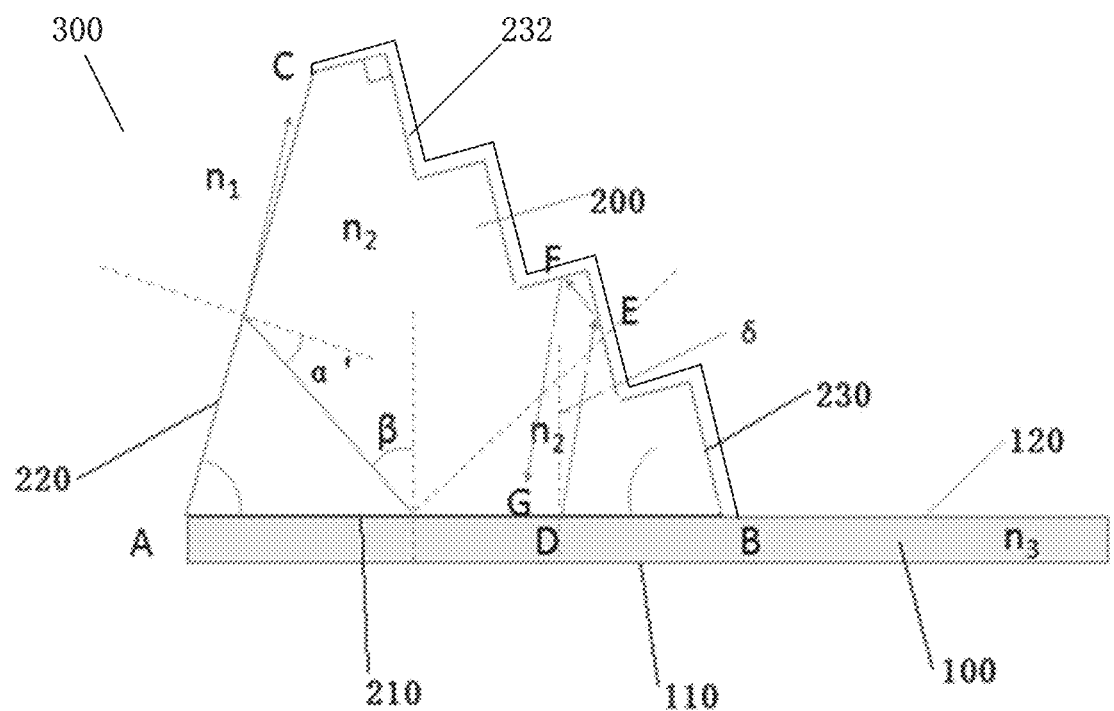
FIG. 2 is a schematic view showing a structure of a light guide assembly according to a further embodiment of the present disclosure.

In accordance with the embodiments of the present disclosure, when the reflective layer 232 is provided on the non-exit face 230, as an example, the non-exit face 230 may be a flat inclined surface, as shown in FIG. 1a. In order to reflect the light incident onto the non-exit face 230 back completely, as shown in FIG. 2 (in the example shown in FIG. 2, the second medium layer is air), the non-exit face 230 in cross section may also be provided with saw teeth and each of the saw teeth has an apex angle of 90°. Thus, when the light in the triangular prism unit 200 reaches the light exit face 230, the light may be reflected back completely, for example, when the light enters the triangular prism unit 200 from a point D of the first medium layer and then reaches a point E on the non-exit face 230, and reflected to a point F on an adjacent sloping surface of the saw tooth, and then reflected by the triangular prism unit 200 again to a point G on the second light incidence face 210 and reflected back. In this way, the light is recycled repeatedly to increase coefficient of utilization of light. And the reflected light FG is parallel to the light DE traveling towards the non-exit face 230, that is, the light traveling towards the non-exit face 230 is reflected by the triangular prism unit 200 and then returns along its original direction.

It should be noted that the angle between the second light incidence face 210 (plane AB) and a connection line between the point B and the point C is still 90°−β, i.e., 90° minus β, in FIG. 2. Thus, it will not influence the angle and the direction of the light emitted from the second medium layer 300.

In accordance with the embodiments of the present disclosure, the number of sloping surfaces of saw teeth on the non-exit face 230 is exemplified, instead of limiting the present disclosure. In the embodiments of the present disclosure, density of the sloping surfaces of the saw teeth is not limited, and can be selected flexibly by the skilled person in the art as required.

Figure 3:
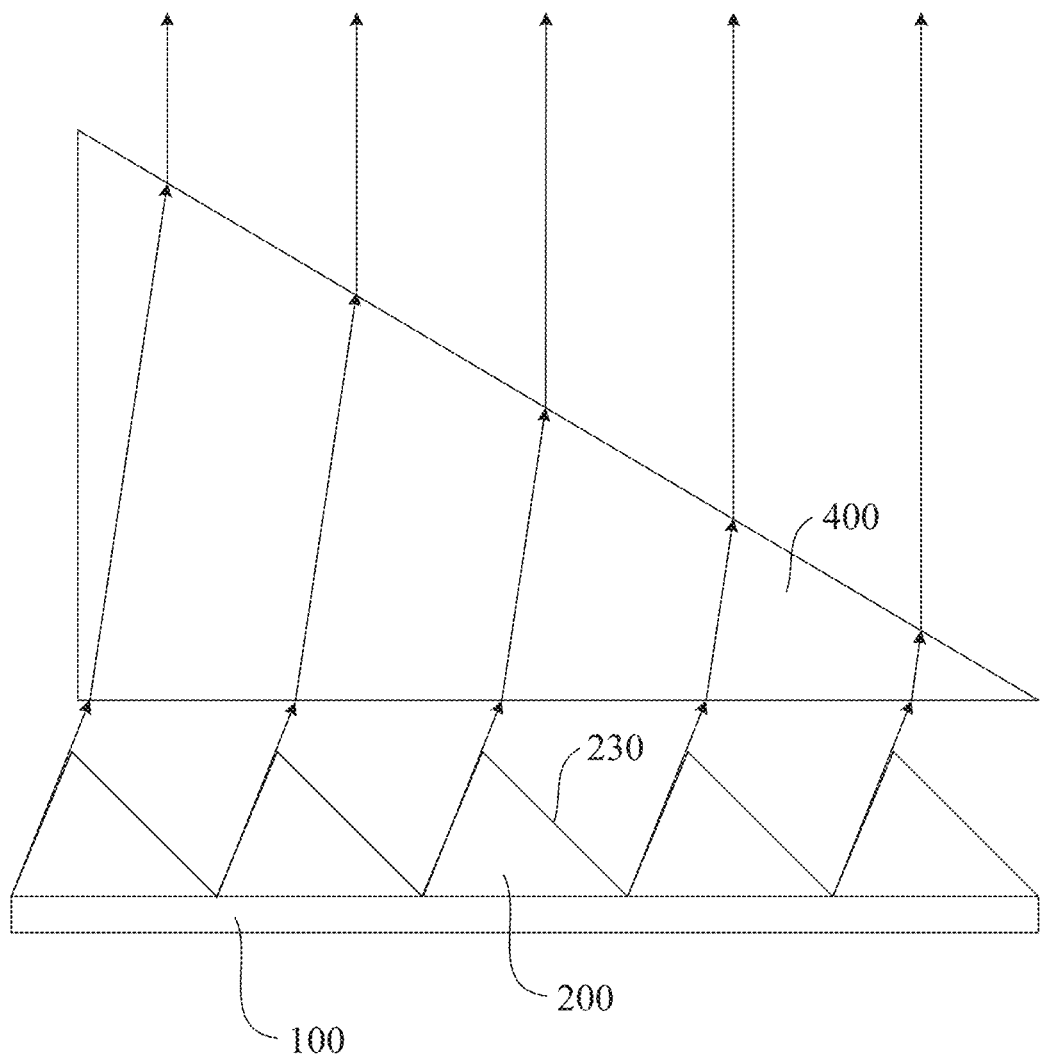
FIG. 3 is a schematic view showing a structure of a light guide assembly according to a yet further embodiment of the present disclosure.

In accordance with the embodiments of the present disclosure, as shown in FIG. 3 (in the example shown in FIG. 3, the light absorption layer 231 is provided on the non-exit face 230), the light guide assembly further includes a light adjusting device 400 configured to adjust a direction of the light emitted from the second medium layer 300 (in the example shown in FIG. 3, the second medium layer 300 is air, that is, the light is emitted directly from the triangular prism unit 200), for example, to adjust the direction of the light to be perpendicular to the first light incidence face 110. At that time, the light may be called as a collimated light. It is helpful for achieving anti-peep function. Thus, by means of the light adjusting device 400, the light emitted from the second light exit face 220 may be adjusted to the collimated light to achieve control of the optical path. Therefore, when the light guide assembly is used in the display device, the anti-peep function of the display device may be achieved.

The skilled person in the art can appreciate that besides achieving the collimated light, the light may be adjusted by the light adjusting device towards other special directions, as required.

Figure 3A:
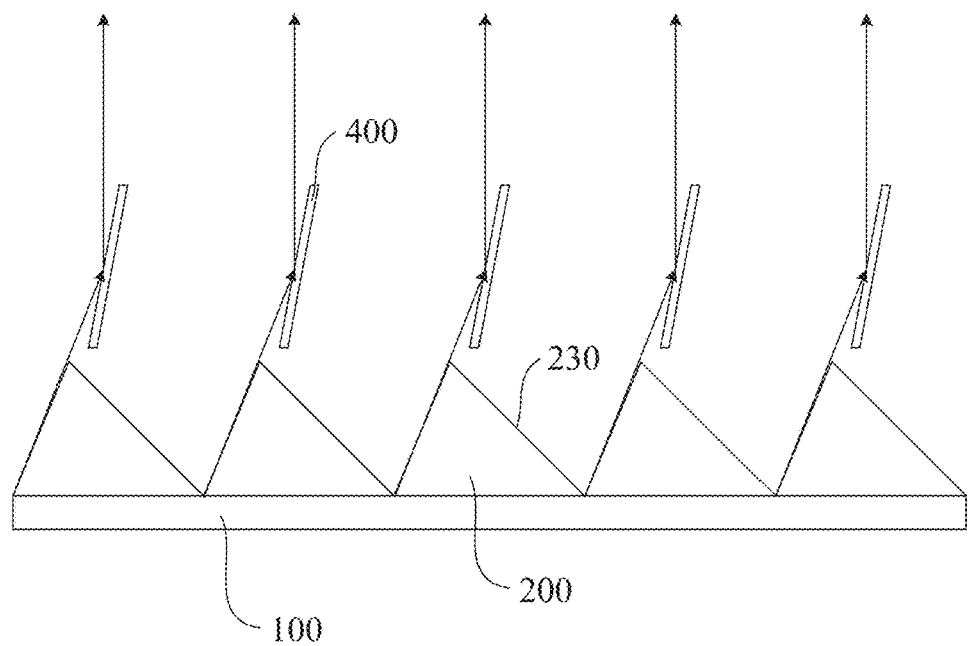
FIG. 3*a* is a schematic view showing a structure of a light guide assembly according to another embodiment of the present disclosure.

In accordance with the embodiments of the present disclosure, the specific types of the light adjusting device 400 are also not limited as long as the optical path can be adjusted. In some embodiments of the present disclosure, the light adjusting device 400 is a refractive device (see FIG. 3) or a reflective device (see FIG. 3a). Thus, the adjusting method is simple and effective, can be operated easily and has low cost. The refractive device or the reflective device may for example be a flat mirror, or may be a prism such as a triangular prism. The refractive device or the reflective device can be selected freely as required as long as it can achieve adjustment of the optical path.

In an embodiment of the present disclosure, at least one triangular prism unit 200, for example a plurality of triangular prism units 200, may be arranged on the first light exit face 120. The plurality of triangular prism units 200 may be arranged side by side on the first light exit face 120, as shown in FIG. 3.

Figure 4:
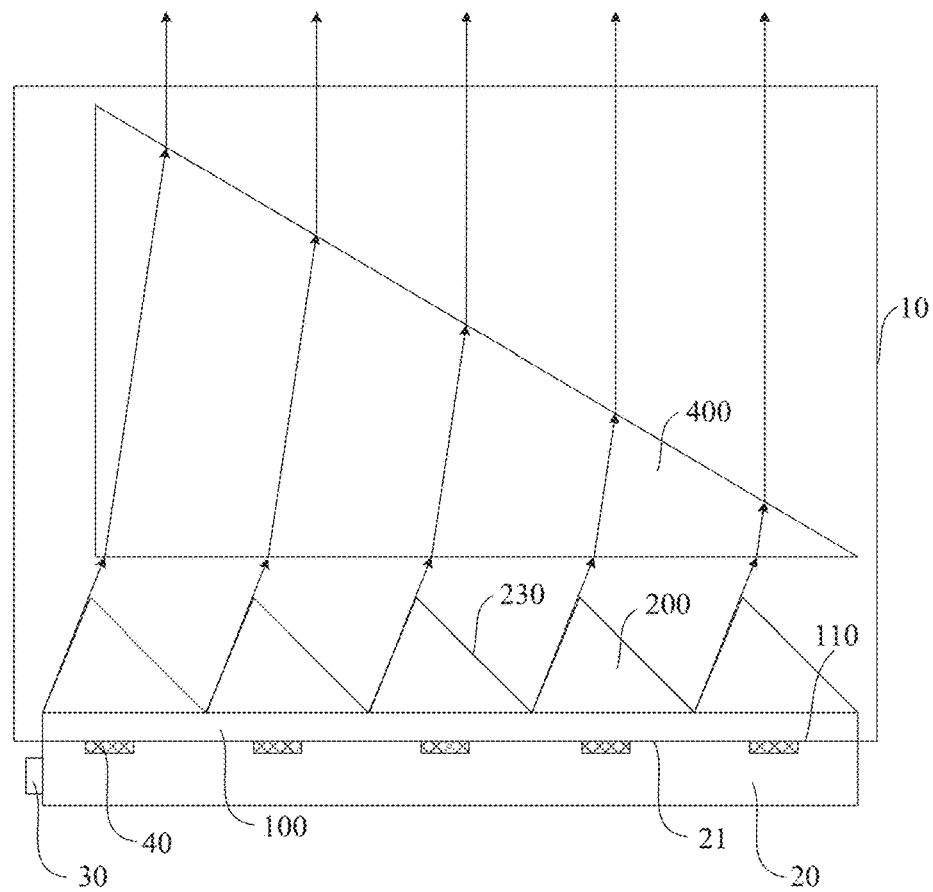
FIG. 4 is a schematic view showing a structure of a backlight source according to an embodiment of the present disclosure.
Figure 4A:
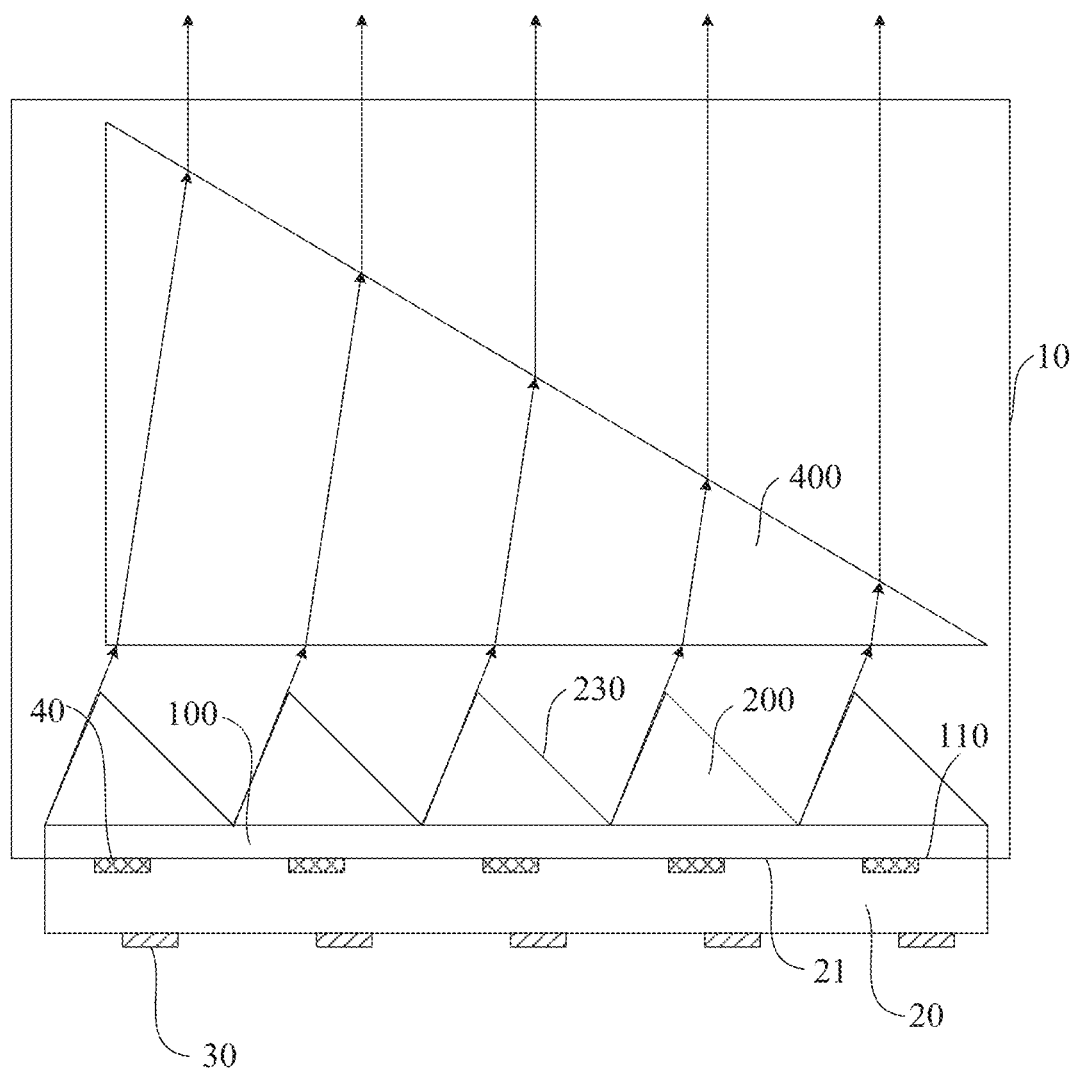
FIG. 4*a* is a schematic view showing a structure of a backlight source according to another embodiment of the present disclosure.

An embodiment of the present disclosure also provides a backlight source 2. As shown in FIG. 4, the backlight source includes: the light guide assembly 10 as described in any one of the above embodiments; a light guide plate 20, the light guide assembly being on a first surface 21 of the light guide plate 20 and the first light incidence face 110 being adjacent to the first surface; and a light source 30. The light source 30 is an edge lighting source (as shown in FIG. 4) or a bottom lighting source (as shown in FIG. 4*a*). Thus, the backlight source may provide a collimated light. When the backlight source is used in the display device, it can achieve anti-peep function effectively.

In accordance with an embodiment of the present disclosure, as shown in FIG. 4, the backlight source 2 may further include a scattering pattern 40 arranged on the first surface 21 of the light guide plate 20. The first surface 21 is for example a light exit surface of the light guide plate 20. Thus, the light emitted from the light guide plate 20 may be scattered towards various directions, i.e., to form an area light source. In this case, the light emitted from the first surface 21 of the light guide plate 20 may be incident onto the light guide assembly 10 along any direction (at an incident angle between 0 degree and 90 degrees). The light emitted from the light guide assembly 10 may be concentrated to a special direction. As shown in FIG. 4, the scattering pattern 40 may be at a side of the first light incidence face 110 of the light guide assembly 10 facing towards the first surface 21 of the light guide plate 20.

Figure 5:
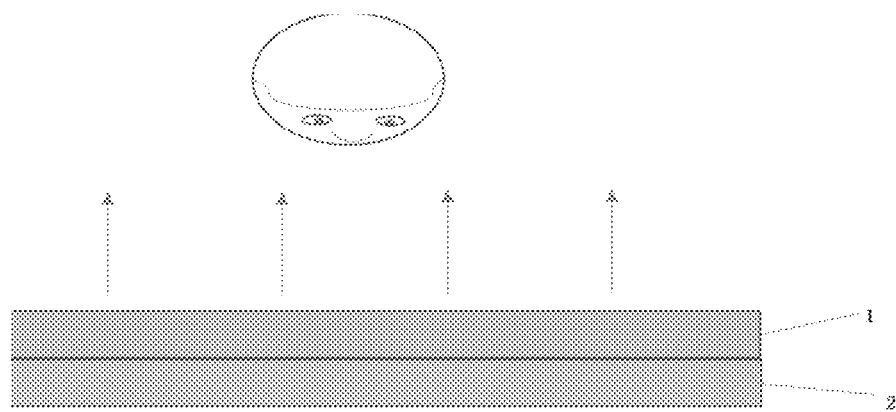
FIG. 5 is a schematic view showing a structure of a display device according to an embodiment of the present disclosure.

In a further aspect of the present disclosure, it provides a display device. In accordance with an embodiment of the present disclosure, the display device includes the light guide assembly 10 or the backlight source 2. The display device may further include a display panel 1 arranged at a light exit side of the backlight source 2, as shown in FIG. 5. In this way, the light guide assembly 10 or the backlight source 2 may provide a collimated light to further achieve anti-peep function of the display device. The effects may be seen in FIG. 5, that is, the collimated light provided by the backlight source 2 travels towards the display panel 1. Thus, the light emitted from the display panel 1 is perpendicular to the display panel. An image on the display panel 1 will not be seen unless eyes see the display panel 1 along a direction perpendicular to the display panel 1. When the eyes deviate from the direction, the image on the display panel 1 cannot be seen clearly, to further achieve the effects of anti-peep.

In accordance with the embodiments of the present disclosure, the specific types of the display device are not limited specially. The display device may be any devices or apparatuses having display function, for example, including, but not limited to, cell phones, tablet computers, computer display devices, game consoles, display screens, wearable devices and other household electric appliances or domestic electric appliances having display function, and so on.

Of course, the skilled person in the art can understood that, besides the light guide assembly or backlight source as discussed above, the display device of the present disclosure may further include necessary structures and components of the related display device. By taking the cell phones as an example, besides the light guide assembly or backlight source of the present disclosure, the display device may further have structures and components of the related cell phones, such as a touch screen, a housing, a CPU, a camera module, a fingerprint recognition module, a voice processing system, and so on. The details will be omitted herein.

In figures of the present specification, the light is indicated by arrows.

In addition, the terms of "first", "second" are only intended for description, instead of being understood to indicate or imply relative significance or to imply the number of technical features. Thus, the features defined by "first", "second" may literally or impliedly include one or more features. In the description of the present disclosure, the term of "a plurality of" means two or more unless defined specifically otherwise.

In the description of the present disclosure, the phrases of "an embodiment", "some embodiments", "example", "specific example" or "some examples", and so on mean that the specific features, structures, materials or characteristics described with reference to the embodiment(s) or example (s) are incorporated in at least one embodiment or example of the present disclosure. In the specification, the above schematic description on the above phrases may not be limited to the same embodiment(s) or example(s). And the specific features, structures, materials or characteristics described may be combined suitably in any one or more embodiments or examples. In addition, the skilled person in the art can combine different embodiments or examples described in the present disclosure, unless they are contradicted with each other.

The above embodiments of the present disclosure have been described, however, the above embodiments are exemplified embodiments, instead of limiting the present disclosure. Modification, change, alternation or variation can be made by those skilled in the art to the above embodiments without departing the scope of the present disclosure.

What is claimed is:

1. A light guide assembly, comprising:
a first medium layer comprising a first light incidence face and a first light exit face opposed to each other;
at least one triangular prism unit on the first light exit face, each of the at least one triangular prism unit comprising a second light incidence face, a second light exit face and a non-exit face, the second light incidence face being in contact with the first light exit face; and
a second medium layer covering the second light exit face,
wherein refractive index $n_2$ of each of the at least one triangular prism unit is greater than refractive index $n_3$ of the first medium layer and refractive index $n_1$ of the second medium layer; and wherein an angle A between the second light incidence face and the second light exit face meets:

$$\alpha+\beta-10°<A<\alpha+\beta,$$

where $\alpha=\arcsin(n_1/n_2)$ and $\beta=\arcsin(n_3/n_2)$.

2. The light guide assembly according to claim 1, wherein the angle A between the second light incidence face and the second light exit face meets:

$$\alpha+\beta-3°<A<\alpha+\beta.$$

3. The light guide assembly according to claim 1, wherein an angle between the second light incidence face and the non-exit face is $90°-\beta$.

4. The light guide assembly according to claim 1, wherein the non-exit face is provided with a reflective layer.

5. The light guide assembly according to claim 4, wherein the non-exit face in cross section is provided with saw teeth, each of the saw teeth having an apex angle of 90°.

6. The light guide assembly according to claim 1, wherein the non-exit face is provided with a light absorption layer.

7. The light guide assembly according to claim 1, wherein each of the at least one triangular prism unit has refractive index greater than or equal to 1.5.

8. The light guide assembly according to claim 7, wherein each of the at least one triangular prism unit is made from $SiN_x$ or glass.

9. The light guide assembly according to claim 1, wherein the refractive index $n_3$ of the first medium layer is less than 1.5.

10. The light guide assembly according to claim 9, wherein the first medium layer is made from silicon dioxide or silicon dioxide aerogel.

11. The light guide assembly according to claim 1, wherein the refractive index $n_1$ of the second medium layer is less than or equal to 1.1.

12. The light guide assembly according to claim 11, wherein the second medium layer comprises air or glass.

13. The light guide assembly according to claim 1, further comprising a light adjusting device configured to adjust a direction along which light is emitted from the second medium layer.

14. The light guide assembly according to claim 13, wherein the light adjusting device is a refractive device or a reflective device.

15. The light guide assembly according to claim 1, wherein the at least one triangular prism unit comprises a plurality of triangular prism units arranged side by side on the first light exit face.

16. A backlight source comprising:

the light guide assembly according to claim 1;

a light guide plate, the light guide assembly being on a first surface of the light guide plate and the first light incidence face being adjacent to the first surface; and a light source, wherein the light source is an edge lighting source or a bottom lighting source.

17. The backlight source according to claim 16, further comprising a scattering pattern on the first surface of the light guide plate and at a side of the first light incidence face facing towards the first surface.

18. A display device comprising the light guide assembly according to claim 1.

19. A display device comprising the backlight source according to claim 16.

* * * * *